UNITED STATES PATENT OFFICE.

ISAAC LICHTENTAG, OF NEW ORLEANS, LOUISIANA.

COMPOSITION FOR THE MANUFACTURE OF ARTIFICIAL STONE OR CEMENT.

SPECIFICATION forming part of Letters Patent No. 377,036, dated January 31, 1888.

Application filed September 11, 1886. Serial No. 213,338. (Specimens.)

*To all whom it may concern:*

Be it known that I, ISAAC LICHTENTAG, a citizen of the United States, residing at New Orleans, in the parish of Orleans and State of Louisiana, have invented a new and useful composition of matter to be used in the manufacture of cements and artificial stones for all purposes to which same can be applied, of which the following is a specification.

My composition consists of the following ingredients: Molasses or honey, or sugar or glucose, or any other saccharine matter, or any of the vegetable acids that dissolve in water, in combination with air-slaked or any other caustic lime, (common or hydraulic) which composition of itself acts as a cement, and which, when used in combination with sand or any other powdered earthy substance in the proportions given below, will produce a solid durable stone.

In manufacturing stone I take (A) molasses or any other saccharine matter, one part, by measure; water, three or four parts; (B) air-slaked or any other caustic lime, (common or hydraulic,) one part, by measure; sand or any other powdered earthy substance, one or two parts—well mixed. A and B are then mixed to the consistency of a stiff dough, which can be molded into any shape or form, and which in a few days will harden into a solid rock.

*Explanation of the hardening process.*—The saccharine matter combines with the lime (common or hydraulic) and produces saccharate of lime, which in turn is converted by the carbonic acid of the atmosphere into carbonate of lime, (common or hydraulic,) thus producing in combination with the sand or any other powdered earthy substance a solid imperishable stone.

What I claim, and desire to secure by Letters Patent of the United States, is—

The herein-described composition of matter, for the purpose specified, consisting of saccharine, air-slaked lime, (common or hydraulic,) sand, and water, in the proportions specified.

New Orleans, Louisiana, August 30, 1886.

ISAAC LICHTENTAG.

Witnesses:
ALEX. LICHTENTAG,
CHARLES BRIESSEN.